March 25, 1941.  F. C. THORPE  2,236,020
TWINE CONE DISPLAY SUPPORT
Filed Sept. 18, 1939
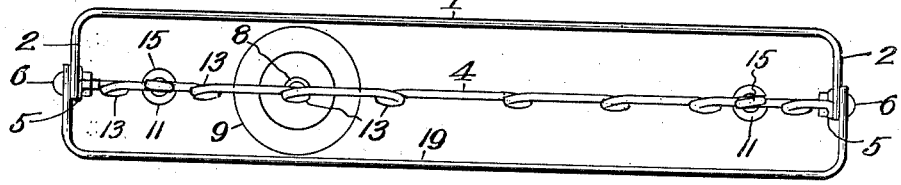
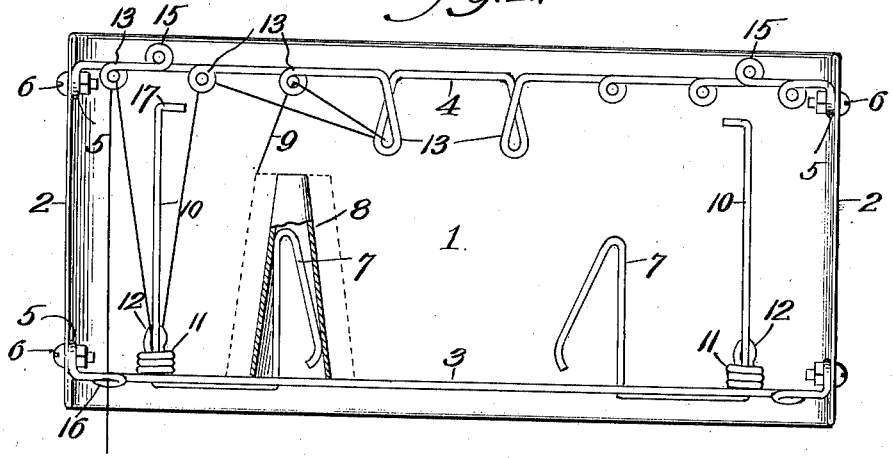
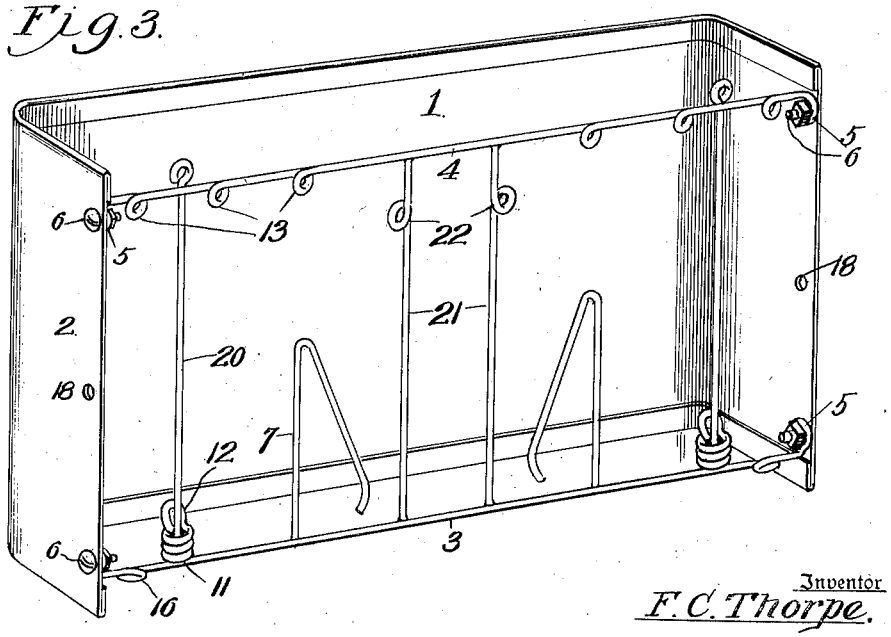
Inventor
F. C. Thorpe.

Patented Mar. 25, 1941

2,236,020

UNITED STATES PATENT OFFICE 2,236,020

TWINE CONE DISPLAY SUPPORT

Frank C. Thorpe, Lamar, Mo.

Application September 18, 1939, Serial No. 295,466

3 Claims. (Cl. 242—143)

This invention relates to twine cone holders and has for its primary object a holder of this kind for store service use which has a space to receive an advertising display sign or the like, and which will take-up the loose end of the cord after use so that it cannot become entangled with objects on a store counter or the like.

A further object of the invention is to provide a construction which conveniently lends itself to the support of a multiplicity of twine cones from the same holder or display container; and which, if desired, may completely enclose the twine holders, so that all operative parts are concealed from view.

With the general objects named in view and others as will hereinafter appear, the invention consists in certain novel and useful features of construction and organization of parts as hereinafter described and claimed; and in order that it may be fully understood, reference is to be had to the accompanying drawing, in which—

Figure 1 is a top plan view of a holder for a twine cone or a pair of twine cones, as shown, the figure including a housing member which in conjunction with the frame member of the device, hides the twine and guiding means therefor from normal view.

Figure 2 is a side elevation of the housing member with one side plate omitted as when it is not desired to entirely conceal the twine cone.

Figure 3 is a perspective view of a modified construction.

In the drawing, where like reference characters identify corresponding parts in all of the figures, 1 is a sheet metal frame and housing member, having a pair of its opposite edges bent to form spaced vertically extending parallel flanges 2. The length of the flanges is at least equal to slightly more than one-half the diameter of the twine cone with which the device is to be used as will hereinafter appear.

Bridging the space between the flanges 2 and secured at their opposite ends to said flanges at points adjacent the upper and lower corners thereof, are a pair of spaced lower and upper parallel rods 3 and 4. Any suitable means may be adopted to secure the rods in position such as by forming their ends with eyes 5 engaged by securing bolts 6. The lower rod 3 carries one or more twine cone supports 7, which in the preferred construction, comprises a resilient inverted V-shaped wire member to be received within the cone 8 on which the twine 9 is wound, said support 7 frictionally gripping the walls of the hollow center of the cone and holding the same against rotation. The rod 3 also carries an upright guide member 10 which may be independent of or integral with one end of the support 7. The guide 10 carries a weight 11 provided with a twine guiding eye 12, to form an automatic twine take-up as will hereinafter appear.

The upper rod 4 is bent to form a plurality of eyes 13 forming twine guides, and in addition thereto said rod may have one or more eyes 15 to provide means for the suspension of the twine cone holder above a counter in a store. In use, when the free end of the twine depending through guide eye 16 in the rod 3, is pulled, the weight 11 initially slides up the guide 10 until it abuts the stop 17. When the twine is released the weight 11 gravitates to its original position and takes up the slack or loose end of the twine by twice the distance the weight travels, and thus frees the counter of possible entanglement of the twine.

When it is desired to completely house the twine and its operative parts so that they are hidden from view, the casing member 1 is provided with end openings to receive bolts 18 used to secure a companion casing member 19, as shown in Figure 1. In Figure 3, a slightly modified construction is shown in which the upper and lower rods are connected together by brace rods 20 and 21. In this construction the brace members 20 may constitute the vertical guides for the yielding twine take-up weight, and may also supply a suspending eye. The other brace rods 21 may be formed with eyes 22 to constitute a part of the twine guide.

From the above description it will be apparent that I have produced a device embodying all of the features of advantage set forth as desirable, and while I have described and illustrated the preferred embodiment, it is to be understood that I reserve the right to all changes within the spirit of the invention and without the ambit of the prior art.

I claim:

1. A twine cone holder comprising a container formed of a pair of spaced parallel metal plates having their upper and lower edges respectively in coplanar relation, vertically extending parallel flanges projecting from each end of each plate with the flanges of the opposite plates in overlapping relation in a plane spaced midway between said plates, a pair of parallel rods spaced midway between the plates and spanning the distance from one set of flanges to the other, said rods respectively being above and below the planes of the lower and upper edges of said plates, means on the lower rod for supporting a twine cone spaced midway between the plates, means on the upper rod for pendently supporting the container, and a plurality of detachable means for simultaneously uniting the adjacent pairs of flanges with the proximate ends of said rods.

2. A twine cone holder comprising a container formed of a pair of spaced parallel metal plates having their upper and lower edges respectively in coplanar relation, vertically extending parallel flanges projecting from each end of each plate with the flanges of the opposite plates in overlapping relation in a plane spaced midway between said plates, a pair of parallel rods spaced midway between the plates and spanning the distance from one set of flanges to the other, said rods being respectively above and below the planes of the lower and upper edges of said plates, eyes formed at each end of said rods, the overlapping plate flanges having openings registering with said eyes, bolts extending through the flange openings and proximate rod eyes for securing the parts in assembled relation, means on the lower rod for supporting a twine cone spaced midway between the plates, and means on the upper rod for pendently supporting the container.

3. A twine cone holder comprising a container formed of a pair of spaced parallel plates having their upper and lower edges respectively in coplanar relation, vertically extending parallel flanges projecting from each end of each plate with the flanges of the opposite plates in overlapping relation in a plane spaced midway between said plates, a pair of parallel rods spaced midway between the plates and spanning the distance from one set of flanges to the other, said rods being respectively above and below the planes of the lower and upper edges of said plates, eyes formed at each end of said rods, the overlapping plate flanges having openings registering with said eyes, bolts extending through the flange openings and proximate rod eyes for securing the parts in assembled relation, means on the lower rod for supporting a twine cone spaced midway between the plates, and a plurality of eyes bent in the upper rod intermediate its length.

FRANK C. THORPE.